July 13, 1948.　　　L. H. THOMPSON　　　2,445,010
SCARIFYING AND INOCULATING NEEDLE
Filed Nov. 7, 1945

Inventor

LEWIS H. THOMPSON

By Clarence A. O'Brien
and Harvey B. Jacobson
Attorneys

Patented July 13, 1948

2,445,010

UNITED STATES PATENT OFFICE 2,445,010

SCARIFYING AND INOCULATING NEEDLE

Lewis H. Thompson, Anson, Tex.

Application November 7, 1945, Serial No. 627,218

4 Claims. (Cl. 128—333)

This invention relates to a veterinary needle and method of inoculation and more particularly to the immunization of animals or fowls from infectious diseases.

In the immunizing of animals and fowls such as sheep, goats, chickens and turkeys from various diseases it has been customary to catch the animal and scarify an area of the skin with a pocket knife or other sharp instrument to produce a wound of considerable area and then to apply the vaccine by dipping a brush in a container in which the vaccine is held and applying the brush to the surface thus scarred. Such a process has required the services of at least two men, one of whom had to catch and hold the animal while the other performed the scarifying and vaccine applying operations. In such a method it frequently occurs that the animal will jump so as to cause the instrument being used for the scarifying to produce a wound of several inches in length, with the result that considerable time was involved before the wound would completely heal and during this period the animal was subject to contract another disease, particularly through the contact of the scarified surface with insects such as blow flies so that the animal became infected.

The primary object of the present invention is to facilitate the immunization of a large number of animals or fowls in a minimum period of time.

Another object is to reduce the size of the wound to enable it to heal in a relatively short time and thus eliminate the danger of infection of the wound.

The above and other objects may be attained by employing this invention which embodies among its features, with a single stroke puncturing the skin of the animal to be immunized and depositing a single drop of immunizing vaccine on the skin adjacent the puncture.

Other features include an inoculating needle comprising a hollow tubular shank of uniform diameter throughout its length to facilitate its insertion in a vaccine containing bottle, a point at one end of the shank adapted to puncture the skin of the animal to be inoculated, a plurality of longitudinally spaced vaccine admitting openings in the needle near the end opposite the point which are adapted to communicate with the interior of the bottle to admit vaccine to the hollow shank and a single vaccine discharge opening at the junction of the shank and the point through which the vaccine admitted to the interior of the needle discharges to form a drop which contacts the skin of the animal in the immediate vicinity of the wound made by the point.

Figure 1:
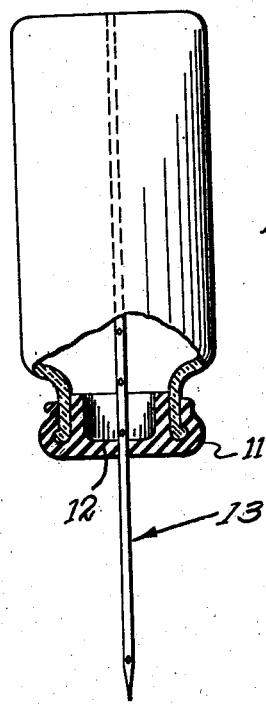
Figure 1 is a side view of a needle embodying the features of this invention showing the same inserted in a vaccine containing bottle.

Referring to the drawings in detail, a vaccine containing bottle 10 is provided with the usual rubber stopper 11 through the end wall 12 of which my improved vaccinating needle designated generally 13 is adapted to be inserted.

Figure 2:
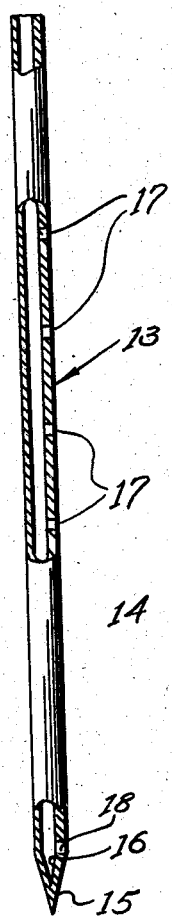
Figure 2 is an enlarged side view of the needle showing portions in section to more clearly illustrate the details of construction.
Figure 3:
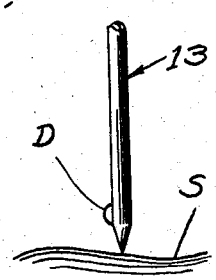
Figure 3 is a fragmentary view showing the needle about to puncture the skin of an animal.
Figure 4:
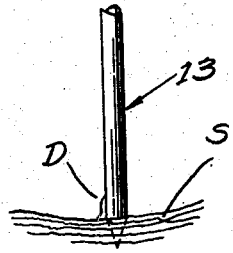
Figure 4 is a view similar to Figure 3 showing the needle after the puncture has been made and the drop of vaccine spreading on the surface of the skin.

The needle 13 comprises a hollow tubular shank 14 one end of which is provided with a point 15 which as illustrated in Figure 2 is formed with a conical recess 16 forming a well, the purpose of which will be more fully hereinafter explained.

Formed in the wall of the tubular shank 14 near the end opposite the point 15 is a single row of longitudinally spaced openings 17 the lowermost of which is adapted to be contained wholly within the bottle 10. These openings serve to establish communication between the interior of the bottle 10 and the interior of the shank 14 to admit the vaccine contained within the bottle to the shank and formed in the shank at the junction of the point and shank is an outlet opening 18 through which the vaccine is discharged.

In operation the bottle 10 containing the vaccine is stoppered in the usual way with the stopper 11 and when it is desired to inoculate a flock of animals or poultry the stopper 11 is punctured preferably by removing the stopper from the neck of the bottle and inserting the point of the needle 13 through the wall 12 as illustrated in Figure 1 so that the lowermost opening 17 communicates with the interior of the bottle 10. The animal to be inoculated must of course be confined within the reach of the operator who then employing the bottle 10 as a handle for the needle 13, with a single stroke punctures the skin of the animal with the point of the needle 13. Upon inserting the needle into the skin to a depth equal to the length of the point 15 the drop D of the vaccine, held by surface tension against the needle and over the aperture 18, will contact the skin S of the animal, thus breaking the surface tension and causing the vaccine to flow over the surface of the skin and when the needle is extracted to enter the puncture thus made. Upon withdrawal of the needle a new drop D of the vaccine will form around the opening 18 ready for a second operation. Due to the fact that the point 15 of the needle is provided with a well 16 it is obvious that a pool of the vaccine will form in this well so as not only to serve as a cushion to prevent the column of vaccine standing within the needle from flowing outwardly in the form of a stream but this pool of vaccine also cooperates with the column contained within the needle, to cause the vaccine discharged through opening 18 to form in the shape of a drop adhering to the needle in the immediate vicinity of said opening and to be thus held by surface tension. From the foregoing it will be obvious that with a single stroke of the needle the skin of the animal to be inoculated is punctured and a single drop of the immunizing vaccine is deposited on the skin adjacent the puncture so that the skin is punctured and the drop is deposited progressively and sequentially with a single movement. In this way a large flock of animals or fowls may be quickly and easily immunized without danger of subsequent infection of the wound due to the fact that the puncture in the skin is of such small dimension that the wound heals within a very short space of time.

This application is a continuation in part of my copending application, Serial Number 568,334 filed December 15, 1944 and now abandoned.

What I claim is:

1. An inoculating needle for dispensing vaccine directly from a vaccine containing bottle comprising a hollow tubular shank of uniform diameter throughout its entire length adapted to enter the bottle through its neck and to extend well into the bottle toward the bottom thereof, a point at one end of the shank adapted to protrude from the neck of the bottle to puncture the skin of an animal to be inoculated, said shank having a plurality of longitudinally spaced vaccine admitting openings near the end opposite the point through which the contents of the bottle may enter the needle and said needle also having a single vaccine discharge opening at its junction with the point.

2. An inoculating needle for dispensing vaccine directly from a vaccine containing bottle comprising a hollow tubular shank of uniform diameter throughout its entire length adapted to enter the bottle through its neck and to extend well into the bottle toward the bottom thereof, a point at one end of the shank adapted to protrude from the neck of the bottle to puncture the skin of an animal to be inoculated, said shank having a plurality of longitudinally spaced vaccine admitting openings near the end opposite the point through which the contents of the bottle may enter the needle, said needle also having a single vaccine discharge opening at its junction with the point, and the point having a well opening into the shank whereby liquid flowing from the bottle through the shank toward the point will form a pool in the well which cooperates with the column of liquid in the shank to hold to the shank by surface tension a drop of liquid emerging through the discharge opening.

3. The combination with a bottle adapted to contain a liquid vaccine capable of immunizing an animal from an infectious disease, and a stopper for said bottle capable of being perforated, of an inoculating needle comprising a hollow tubular shank of uniform diameter throughout its length, a point at one end of the shank adapted to be used for puncturing the skin of an animal to be inoculated and also to perforate the bottle stopper to admit the shank to the bottle, said shank having a plurality of longitudinally spaced vaccine admitting openings near the end opposite the point said openings being disposed within the bottle for establishing communication between the interior of the bottle and the interior of the shank and said shank also having a single vaccine discharge opening at its junction with the point.

4. The combination with a bottle adapted to contain a liquid vaccine capable of immunizing an animal from an infectious disease, and a stopper for said bottle capable of being perforated, of an inoculating needle comprising a hollow tubular shank of uniform diameter throughout its length, a point at one end of the shank adapted to be used for puncturing the skin of an animal to be inoculated and also to perforate the bottle stopper to admit the shank to the bottle, said shank having a plurality of longitudinally spaced vaccine admitting openings near the end opposite the point for disposition within the bottle to establish communication between the interior of the bottle and the interior of the shank and said shank also having a single vaccine discharge opening at its junction with the point, and the point having a well opening into the shank whereby liquid flowing from the bottle through the shank toward the point will form a pool in the well which cooperates with the column of liquid in the shank in holding to the shank by surface tension a drop of liquid emerging through the discharge opening.

LEWIS H. THOMPSON.

REFERENCES CITED

The following references are of record in the file of this patent:

UNITED STATES PATENTS

| Number | Name | Date |
|---|---|---|
| 1,607,271 | Smith | Nov. 16, 1926 |

FOREIGN PATENTS

| Number | Country | Date |
|---|---|---|
| 446,818 | Germany | July 11, 1927 |